A. SODERBERG.
TRAY TURNER.
APPLICATION FILED NOV. 21, 1919.
1,342,774.
Patented June 8, 1920.
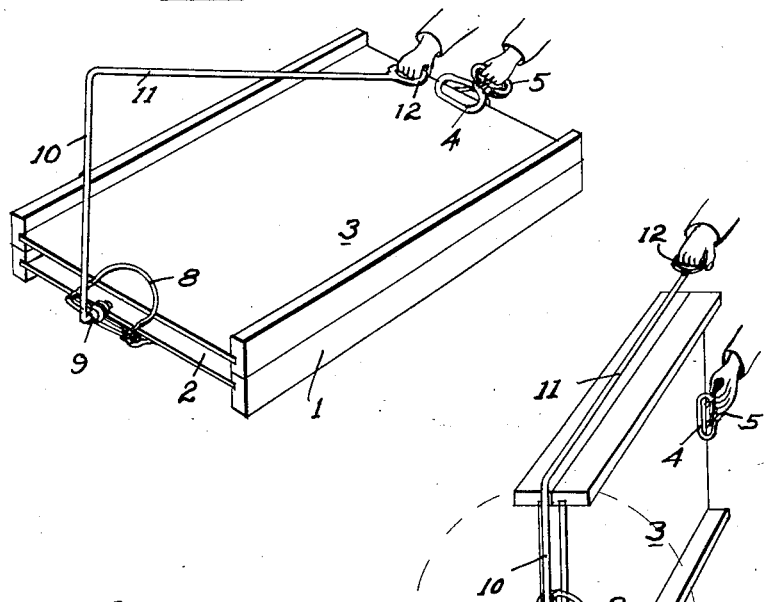
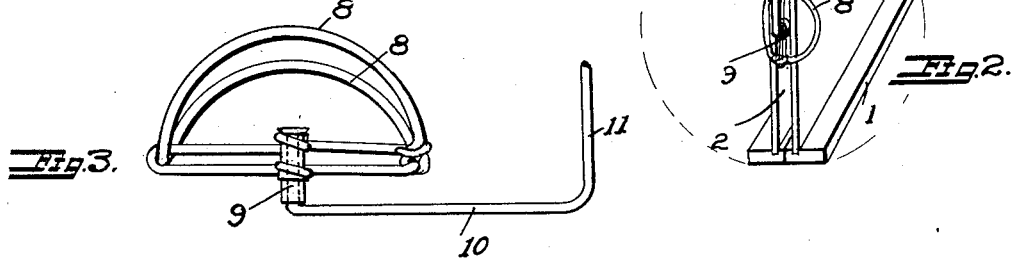
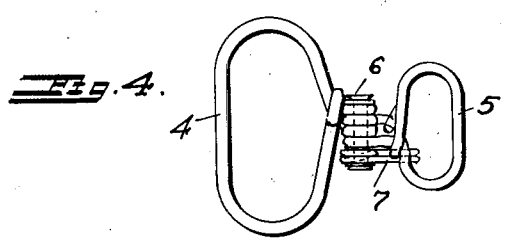
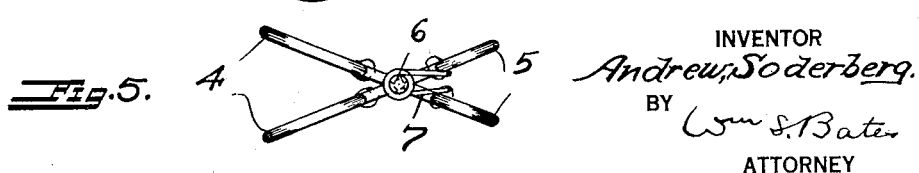
INVENTOR
Andrew Soderberg.
BY
Wm S. Bates
ATTORNEY

UNITED STATES PATENT OFFICE.

ANDREW SODERBERG, OF BERKELEY, CALIFORNIA.

TRAY-TURNER.

1,342,774.

Specification of Letters Patent.

Patented June 8, 1920.

Application filed November 21, 1919. Serial No. 339,536.

*To all whom it may concern:*

Be it known that I, ANDREW SODERBERG, of Berkeley, California, have invented certain new and useful Improvements in Tray-Turners, whereof the following is a specification.

This invention relates to devices for turning trays which are used for drying fruit. The invention has been designed more particularly for use with trays for drying raisins, and will therefore be described in connection with that use.

In drying raisins, it has been customary, when the fruit has been exposed to the drying agency for a time, to turn it over, so that the other side of the fruit may be similarly exposed. To do this, after the fruit has been exposed on a tray for a sufficient period, we place a second tray over the first one. An attendant at each end of the trays then takes hold of them, and, with a quick motion reverses them. The upper of the two trays is then removed, leaving the fruit on the lower one, in a reversed position to that which it previously occupied. It is the purpose of the present invention to enable one man to handle and reverse the two trays. This purpose I accomplish by means of clamps by which an attendant, standing preferably at one end of the trays, may seize the edges of the trays and hold them firmly together and reverse them. One of these clamps he may hold in his hand and cause to engage the near end, while the other may be provided with an overreaching extension which may be held in the other hand, the right hand being used for one, and the left hand for the other, for example.

In the accompanying one sheet of drawing I have fully illustrated the invention as applied to handling raisin trays, leaving it to the mechanic to adapt it to other uses when desired. In the drawing:

Figure 1 is a perspective view of two trays, superposed, ready to turn, with the clamps applied, and showing the hands of an attendant holding the clamps.

Fig. 2 is a perspective view, showing the trays half turned over.

Fig. 3 shows a side view of the clamp for the far end of the tray, with a part of the overreaching bar.

Fig. 4 shows the clamp for the near end of the tray in plan.

Fig. 5 shows the same in side elevation.

In the figures: The tray 1 is that on which the fruit has been exposed. The fruit is indicated at 2. To reverse the fruit, the second tray 3 is placed upon the first tray 1, so that the fruit is confined between them, and the two trays then turned over.

Referring more particularly to Fig. 4, the clamp therein shown, comprises the jaws 4 and the hand holes 5, oscillatable about the pivot 6, and maintained in an open position by a spring 7.

Referring more particularly to Fig. 3, the device therein shown comprises the jaws 8, to which are pivotally attached the extension member, composed of the offset portion 9, which engages the clamp member, the side portion 10, of a length to extend beyond the edges of the tray, as seen in Fig. 2, and the longitudinal portion 11, of a length to extend from the end of the tray to the operator at the opposed end, at which the member may conveniently have a hand grip, 12, as seen in Figs. 1 and 2. The jaws 8 may be fixed jaws, opening with a flare, into which the edge of the tray may enter and be firmly held.

In use, the two trays being placed as seen in Fig. 1, the operator graps the handhold 12 and manipulates the member so that the jaws 8 are drawn upon the edges of the trays, as seen in Figs. 1 and 2. He then takes, with his free hand the holds 5, and, thrusting the jaws 4 over the edges of the trays, causes them to bite thereon. Then, with a quick turn, he reverses the trays, the trays passing through the position seen in Fig. 2, and coming to rest in a position similar to that seen in Fig. 1, except that tray 1 is above and tray 3 below. The upper tray is then removed, leaving the fruit on the lower tray, ready to be again exposed to the drying agency.

I claim—

1. A tray reversing mechanism, comprising, in combination, a clamp adapted by the pressure of the operator's hand, to engage two superposed trays, at one end thereof, and to hold and reverse the same, and a second clamp adapted to engage and hold the tray edges at the end opposite said first named clamp, said second clamp provided with an overreaching extension pivotally connected thereto, and extending to the vicinity of said first clamp.

2. A tray reversing mechanism, comprising, in combination, a hand clamp adapted to seize and hold two trays, at one end thereof, and a second clamp adapted to seize and hold the two trays at the opposite end, said last mentioned clamp provided with an extension member extending laterally a sufficient distance to pass the side edges of the trays, and longitudinally to a position approximating said first mentioned clamp.

3. A tray reversing mechanism, comprising, in combination, a hand clamp adapted to be closed upon the edges of two trays by the grasp of the operator, and a clamp with fixed flaring jaws, provided with an overreaching extension, and adapted to be drawn into engagement with the trays by the same operator who manipulates said first mentioned clamp.

In testimony that I have invented and claim the foregoing, I have hereto set my hand in the presence of two witnesses, this 14th day of November, 1919.

ANDREW SODERBERG.

Witnesses:
HENRY B. LESTER,
WM. S. BATES.